(No Model.) 2 Sheets—Sheet 2.
E. B. GOELET.
CAR SEAT.
No. 400,561. Patented Apr. 2, 1889.
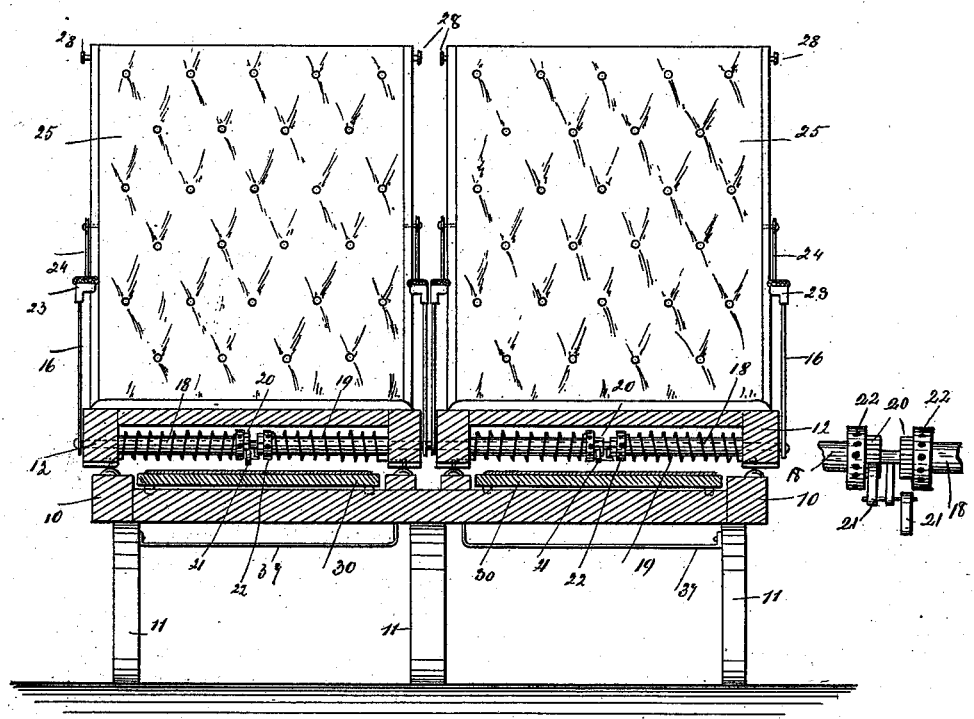
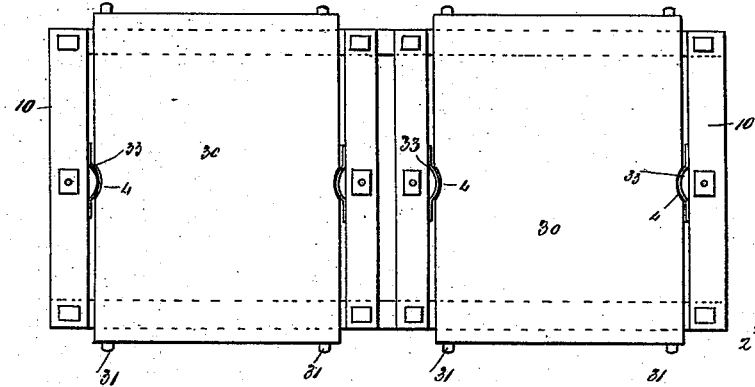
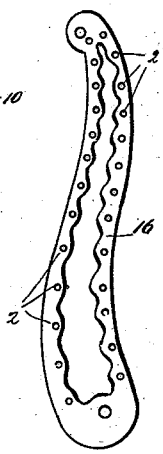
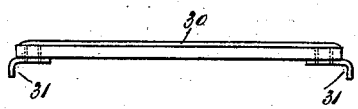
WITNESSES:
INVENTOR:
E. B. Goelet
BY Munn & Co.
ATTORNEYS.

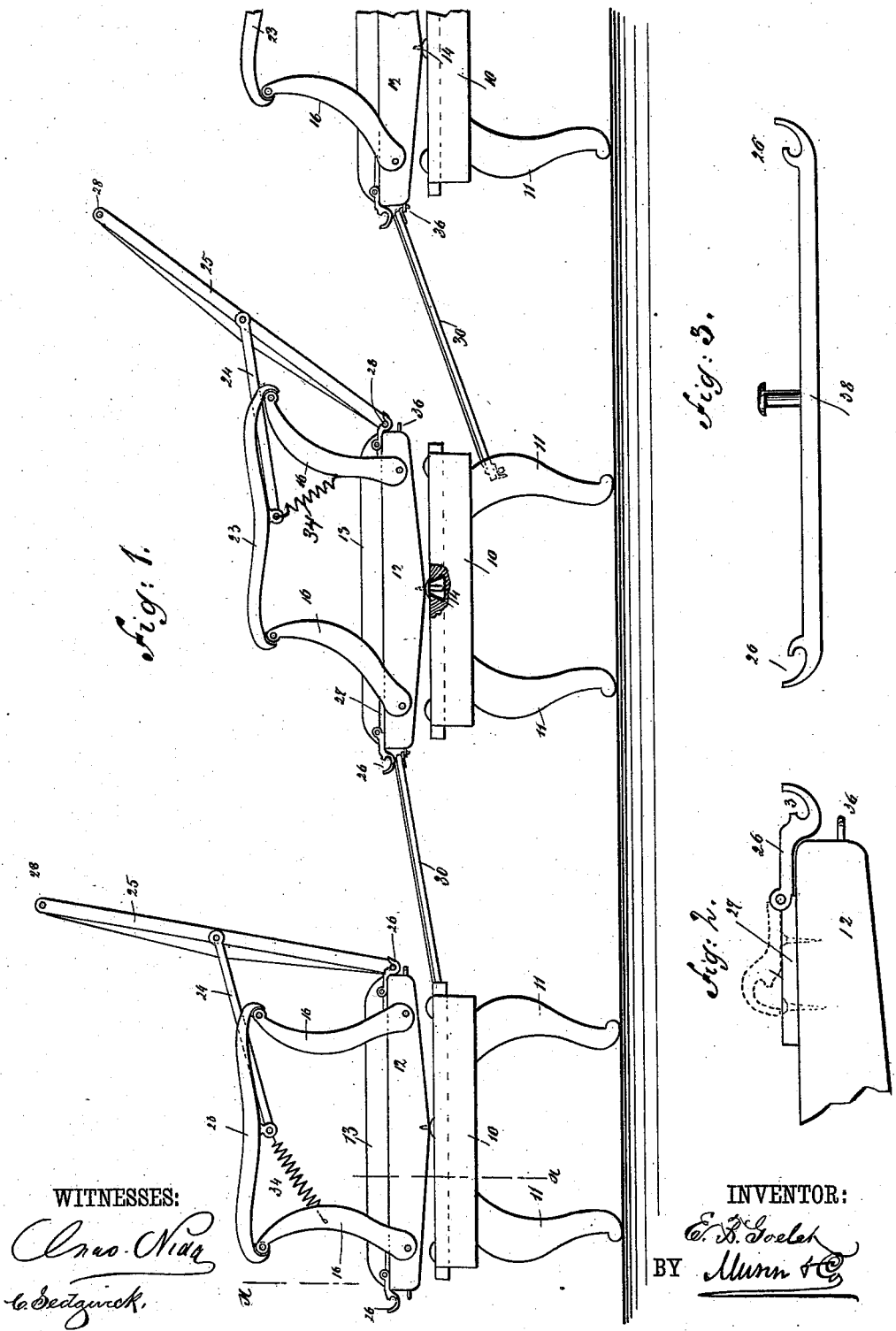

UNITED STATES PATENT OFFICE.

EDWARD B. GOELET, OF FORT WORTH, TEXAS.

CAR-SEAT.

SPECIFICATION forming part of Letters Patent No. 400,561, dated April 2, 1889.

Application filed May 22, 1888. Serial No. 274,655. (No model.)

*To all whom it may concern:*

Be it known that I, EDWARD B. GOELET, of Fort Worth, in the county of Tarrant and State of Texas, have invented a new and Improved Car-Seat, of which the following is a full, clear, and exact description.

This invention relates to an inexpensive form of car-seat, wherein the parts are so arranged that the back of the seat may be adjusted to almost any angle desired, a leg or foot rest, which also may be adjusted to suit the convenience of the occupant of the seat, being arranged in connection with the seat, all as will be hereinafter described, and specifically pointed out in the claims.

Reference is to be had to the accompanying drawings, forming a part of this specification, in which similar figures of reference indicate corresponding parts in all the views.

Figure 1 is an end view of a series of seats, the seat upon the left being represented as it appears when the back is in the most elevated position, while the central seat and the seat upon the right are shown as they appear when the back is tilted to the rear and the foot-rest is arranged for the support of the feet of the occupant. Fig. 2 is a detail view representing one of the catches employed to support the back of the seat. Fig. 3 is a view of a modified form of catch, the catch in this case being in the form of a sliding bar. Fig. 4 is a sectional elevation of two seats, the view being taken on the line $x\,x$ of Fig. 1. Fig. 5 is a plan view of the base upon which the two seats are supported. Fig. 6 is a side view of the foot-rest, and Fig. 7 is a detail view of one of the arm-rest supports.

In constructing such a seat as the one forming the subject-matter of this application I provide a main supporting-frame, 10, which usually is upheld by legs 11. This frame 10 is designed to support two seats, the frames of which seats are shown at 12, said frames being rectangular, and being, as usual, provided with upholstering 13. The lower edges of the side lengths of the frames 12 are doubly inclined, the weight of the frame being supported at the apexes of the two inclined faces by a rubber or other spring, 14, a pin passing downward through said spring and riding in a slot formed in the frame 10; or any other means for preventing all accidental displacement of the seat, but allowing for the rocking of the said seat, may be employed.

To each of the side lengths of the frame 12, I connect two arm-rest supports, 16, which supports are constructed as represented in Fig. 7—that is, with a series of apertures, 2, just within each edge. These arm-rest supports are rigidly connected to shafts 18, about which there are coiled torsion-springs 19, the shafts being provided with ratchets 20, that are engaged by pawls 21. These springs 19 act by torsion to throw the arm-rest supports toward the center of the seat, and the tension of the springs may be regulated as desired by winding them up upon their shafts, this winding being effected by means of a lever that is arranged to engage one or other of the apertures formed in the peripheral faces of the disks or collars 22, that are carried by the shafts, one end of each of the springs being secured to said disks or collars, while the other end of said spring is secured to the seat-frame. To the arm-rest supports 16, I preferably connect arm-rests 23, and these arm-rests in turn serve as the supports for the link or links 24, to which the backs 25 are connected.

In order that the lower edge of the back may be supported, I provide such a construction as is illustrated in Fig. 2, which represents a hook, 26, that is hinged to a plate, 27, the plates being connected to the end of the side lengths of the frame, and the hooks 26 serving to receive the shanks of the pivot-pins 28, that are secured to the side lengths of the back frame at points near the ends of the side lengths, the shanks of these pins resting in the recesses 3 of the hooks 26.

Beneath the seat proper I house the foot or leg supports 30, which supports are provided with hooks 31 and recesses 4 in their side faces, said recesses being entered by springs 33 when the foot-rests are supported in the position in which they are shown in Fig. 5, all displacement of the foot-rests being prevented by the said springs.

In order that the backs 25 may be yieldingly held in any position to which they may be adjusted, I connect spiral springs 34 to the arm-rests 23, the other ends of these springs being arranged so that they may be detachably connected to the arm-rest supports 16, engaging with any one of the apertures 2 of the said supports which may best serve the purpose of the occupant of the seat; or, if desired, any proper clamping mechanism may be employed, so that after the backs have been adjusted to the desired angle they may be there clamped and held to place. When the back and seat are in the position shown to the left of Fig. 1, the tendency of the spring 34 will be to hold them so, and act as an auxiliary to the springs 18, and will assist in retaining the back in an upright position. If, however, it is desired to retain the chair in the inclined position of the next or middle chair, the lower end of the spring will be disconnected from the front support, 16, and hooked into one of the apertures 2 in the rear support, so as to draw the arm-rest 23 and the rear support toward each other, thereby overcoming the tendency of the springs 18 to throw the back into a vertical position.

To each end of the side lengths of the frame 12, I secure staples or eyes 36, with which the hooks 31 of the foot-rests 30 engage, the opposite ends of said foot-rests being brought into engagement with a cross-bar, 37, or with the eyes 36 of the seat next in front; or both ends of the foot-rests might be brought into engagement with the bars 37.

From the construction described it will be seen that backs may be readily shifted, so that the seats may always be made to face forward irrespective of the direction in which the cars travel. As the backs are shifted, the hooks 25 upon the forward edge of the seat are folded back, as represented in dotted lines in Fig. 2; but if such a construction as that shown in Fig. 3 be employed, wherein the hooks 25 are made integral with a bar, 38, the bar is moved forward or by the handle on its upper side backward, so that the hook at the rear of the seat will be exposed—that is, moved to a position to receive the shank of the pivot-pin 28.

Having thus fully described my invention, I claim as new and desire to secure by Letters Patent—

1. The combination, with a seat-frame having parallel transverse front and rear rock-shafts and oppositely-acting springs connected to and rotating said shafts toward each other, of supports rigidly secured to the ends of said shafts and normally held in an upwardly-projecting position, arm-rests pivotally connecting said supports at their upper ends, and a reversible back pivotally connected to said rests, whereby the back will be yieldingly supported in either of its two positions against the action of one of said spring-controlled shafts, substantially as set forth.

2. The combination, with a seat-frame having parallel transverse rock-shafts, each shaft having a torsion-spring tending to rotate it toward the other, of the front and rear supports rigidly attached at their lower ends to the ends of the said shafts and held normally in an upwardly-projecting yielding position by the force of said springs, the arm-rests pivoted at their ends to said supports, and the reversible seat-back having links pivotally connecting its ends with the said arm-rests, whereby the back may be inclined against the action of one of the said torsion-springs in either of its positions, substantially as set forth.

3. The combination, with the seat-frame having front and rear back-supporting hooks or bearings, parallel front and rear transverse rock-shafts, two coiled torsion-springs on each shaft connected at their outer ends with the seat-frame, the springs on one shaft being coiled oppositely to those on the other to rotate the shafts toward each other, collars loose on the shafts and connected to the inner ends of the springs, and pawl-and-ratchet mechanisms connecting the said shafts and collars, of the supports 16, rigidly connected at their lower ends to the ends of the shafts to rock them against the torsion of one pair of said springs, according to the position of the seat-back, arm-rests pivotally connecting the upper ends of the said supports, and the reversible seat-back having links or arms pivotally connecting its ends to the said arm-rests, substantially as set forth.

4. The combination, with the seat-frame, front and rear rock-shafts provided with torsion-springs to rotate them toward each other, the supports rigidly secured to the ends of said shafts, and the arm-rests pivoted at their ends to the upper ends of the said supports, of the spring 34, secured at its upper end to the arm-rest, and means for connecting its lower end to either the front or rear support at different heights, substantially as set forth.

5. The combination, with the seat-frame and its reversible back, of the sliding bars mounted on the seat-frame and having hooks at their ends to receive either longitudinal edge of the back, substantially as set forth.

6. The combination, with a seat-frame and its reversible back, of the sliding bars mounted on the seat-frame and having upward-projecting hooks at their opposite ends to receive either longitudinal edge of the back, and each having an intermediate handle projection on its upper side between its ends, substantially as set forth.

7. The combination, with the main support 10, having inwardly bowed or curved springs 33 on the inner faces of its side bars, of the removable rest 30, having recesses in its sides to receive the bowed portions of said springs and be thereby held in place, substantially as set forth.

EDWARD B. GOELET.

Witnesses:
W. E. PARDUE,
ED HESLEP.